US012260708B2

(12) United States Patent
Sevigny et al.

(10) Patent No.: US 12,260,708 B2
(45) **Date of Patent: *Mar. 25, 2025**

(54) GAMING MACHINE AND METHOD FOR REPLAYING REELS

(71) Applicant: Aristocrat Technologies Australia Pty Limited, North Ryde (AU)

(72) Inventors: Jayme Dale Sevigny, Nashville, TN (US); David Robert Marsh, Charlottesville, VA (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/436,840

(22) Filed: Feb. 8, 2024

(65) Prior Publication Data

US 2024/0185685 A1 Jun. 6, 2024

Related U.S. Application Data

(63) Continuation of application No. 18/048,337, filed on Oct. 20, 2022, now Pat. No. 11,935,362, which is a (Continued)

(51) Int. Cl.

*G07F 17/32* (2006.01)
*G06Q 50/34* (2012.01)
*G07F 17/34* (2006.01)

(52) U.S. Cl.

CPC ......... *G07F 17/3267* (2013.01); *G06Q 50/34* (2013.01); *G07F 17/3211* (2013.01); *G07F 17/3258* (2013.01); *G07F 17/34* (2013.01)

(58) Field of Classification Search

CPC ............. G07F 17/3267; G07F 17/3225; G07F 17/3213; G07F 17/3244; G07F 17/3211; G07F 17/3258; G07F 17/34; G06Q 50/34

(Continued)

(56) References Cited

U.S. PATENT DOCUMENTS 5,971,849 A 10/1999 Falciglia
6,146,271 A 11/2000 Kadlic
(Continued)

FOREIGN PATENT DOCUMENTS

AU 2004202643 B2 1/2005
AU 2007231800 B2 5/2012
(Continued)

OTHER PUBLICATIONS

Australian Examination Report No. 1 issued in App. No. AU2019222966, dated Jun. 7, 2024, 3 pages.

(Continued)

*Primary Examiner* — Michael A Cuff
(74) *Attorney, Agent, or Firm* — Armstrong Teasdale LLP

(57) ABSTRACT

An electronic gaming machine includes a display, a credit input mechanism, and a processor programmed to perform operations comprising: (i) determining, during a wagering game initiated in response to receiving a credit wager, that a replay trigger condition is satisfied, the wagering game including a plurality of reels; (ii) initiating, in response to the replay trigger condition, a replay bonus game; (iii) determining a number of replays for use in the replay bonus game; (iv) generating a set of symbols for the plurality of reels for each of the number of replays including an award amount associated with the set of symbols; (v) serially displaying, on the display each of the sets of symbols for each of the number of replays; and (vi) awarding a total award amount including the sum of each award amount for each of the sets of symbols.

20 Claims, 4 Drawing Sheets

Related U.S. Application Data continuation of application No. 17/104,390, filed on Nov. 25, 2020, now Pat. No. 11,482,078, which is a continuation of application No. 16/100,851, filed on Aug. 10, 2018, now Pat. No. 10,867,479.

(58) Field of Classification Search
USPC .................................................... 463/16–20
See application file for complete search history.

(56) References Cited

U.S. PATENT DOCUMENTS

| | | | | |
|---|---|---|---|---|
| 6,234,897 | B1 | 5/2001 | Frohm | |
| 6,299,165 | B1 | 10/2001 | Nagano | |
| 6,582,305 | B1 | 6/2003 | Carter | |
| 6,626,758 | B1 | 9/2003 | Parham | |
| 7,052,395 | B2 | 5/2006 | Glavich | |
| 7,097,560 | B2 | 8/2006 | Okada | |
| 7,166,028 | B2 | 1/2007 | Fasbender | |
| 7,300,351 | B2 | 11/2007 | Thomas | |
| 7,632,184 | B2 | 12/2009 | Gauselmann | |
| 7,704,137 | B2 | 4/2010 | Englman | |
| 7,740,245 | B2 | 6/2010 | Tarantino | |
| 7,749,072 | B1 | 7/2010 | Singer | |
| 7,846,018 | B2 | 12/2010 | Baerlocher | |
| 7,938,719 | B2 | 5/2011 | Fasbender | |
| 7,993,195 | B2 | 8/2011 | Belger | |
| 8,287,367 | B2 | 10/2012 | Hall | |
| 8,323,094 | B2 | 12/2012 | Palermo | |
| 8,454,429 | B2 | 6/2013 | Jaffe | |
| 8,506,380 | B2 | 8/2013 | Hughes | |
| 8,506,386 | B2 | 8/2013 | Harris | |
| 8,696,436 | B2 | 4/2014 | Acres | |
| 8,708,806 | B2 | 4/2014 | Wabschall | |
| 9,017,160 | B2 | 4/2015 | Moroney | |
| 9,064,383 | B2 | 6/2015 | Palermo | |
| 9,728,043 | B2 | 8/2017 | Acres | |
| 9,959,708 | B2 | 5/2018 | Caputo | |
| 10,614,666 | B2 | 4/2020 | Eubanks | |
| 11,043,075 | B2 | 6/2021 | Eubanks | |
| 11,423,744 | B2 | 8/2022 | Eubanks | |
| 11,769,374 | B2 | 9/2023 | Eubanks | |
| 2002/0010016 | A1 | 1/2002 | Tsukahara | |
| 2002/0086725 | A1 | 7/2002 | Fasbender | |
| 2002/0155880 | A1 | 10/2002 | Glavich | |
| 2003/0032470 | A1 | 2/2003 | Weiss | |
| 2003/0060276 | A1 | 3/2003 | Walker | |
| 2003/0064797 | A1 | 4/2003 | Jackson | |
| 2003/0114217 | A1 | 6/2003 | Walker | |
| 2003/0125100 | A1 | 7/2003 | Cannon | |
| 2003/0236118 | A1 | 12/2003 | Okada | |
| 2004/0023709 | A1 | 2/2004 | Beaulieu | |
| 2004/0033827 | A1 | 2/2004 | Gilmore | |
| 2004/0053666 | A1 | 3/2004 | Vancura | |
| 2004/0082384 | A1 | 4/2004 | Walker | |
| 2004/0087360 | A1 | 5/2004 | Chamberlain | |
| 2004/0242320 | A1 | 12/2004 | Jackson | |
| 2004/0259627 | A1 | 12/2004 | Walker | |
| 2004/0266516 | A1 | 12/2004 | Thomas | |
| 2005/0060050 | A1 | 3/2005 | Baerlocher | |
| 2005/0075156 | A1 | 4/2005 | Seelig | |
| 2005/0075163 | A1 | 4/2005 | Cuddy | |
| 2005/0153769 | A1 | 7/2005 | Casey | |
| 2005/0187005 | A1 | 8/2005 | Rose | |
| 2006/0068903 | A1 | 3/2006 | Walker | |
| 2006/0079313 | A1 | 4/2006 | Trainor | |
| 2006/0111172 | A1 | 5/2006 | Walker | |
| 2006/0199634 | A1 | 9/2006 | Anderson | |
| 2006/0223632 | A1 | 10/2006 | Walker | |
| 2006/0244211 | A1 | 11/2006 | Osawa | |
| 2006/0247006 | A1 | 11/2006 | Inamura | |
| 2006/0247007 | A1 | 11/2006 | Inamura | |
| 2007/0167211 | A1 | 7/2007 | Rodgers | |
| 2007/0202943 | A1 | 8/2007 | Thomas | |
| 2007/0293297 | A1 | 12/2007 | Schugar | |
| 2008/0102916 | A1 | 5/2008 | Kovacs | |
| 2008/0108431 | A1 | 5/2008 | Cuddy | |
| 2008/0113734 | A1 | 5/2008 | Watkins | |
| 2008/0113777 | A1 | 5/2008 | Anderson | |
| 2008/0318656 | A1 | 12/2008 | Walker | |
| 2009/0017897 | A1 | 1/2009 | Fujimoto | |
| 2009/0124332 | A1 | 5/2009 | Baerlocher | |
| 2009/0124346 | A1 | 5/2009 | Baerlocher | |
| 2009/0197664 | A1 | 8/2009 | Schultz | |
| 2009/0200740 | A1 | 8/2009 | Falciglia, Sr. | |
| 2009/0239601 | A1 | 9/2009 | Macke | |
| 2009/0275382 | A1 * | 11/2009 | Vallejo | G07F 17/3209 463/20 |
| 2009/0275387 | A1 | 11/2009 | Yoshizawa | |
| 2010/0029364 | A1 | 2/2010 | Zielinski | |
| 2010/0056248 | A1 | 3/2010 | Acres | |
| 2010/0120492 | A1 | 5/2010 | Davis | |
| 2010/0120525 | A1 | 5/2010 | Baerlocher | |
| 2010/0124971 | A1 | 5/2010 | Baerlocher | |
| 2010/0137056 | A1 | 6/2010 | Hoffman | |
| 2011/0045892 | A1 | 2/2011 | Vann | |
| 2011/0059791 | A1 | 3/2011 | Tarantino | |
| 2011/0118001 | A1 | 5/2011 | Vann | |
| 2011/0118006 | A1 | 5/2011 | Acres | |
| 2011/0124400 | A1 | 5/2011 | Scholtz | |
| 2011/0130198 | A1 | 6/2011 | Van Linden | |
| 2011/0244935 | A1 | 10/2011 | Matthews | |
| 2011/0269548 | A1 | 11/2011 | Barclay | |
| 2012/0034967 | A1 | 2/2012 | Owen | |
| 2012/0061150 | A1 | 3/2012 | Coulombe | |
| 2012/0122543 | A1 | 5/2012 | Watkins | |
| 2012/0157195 | A1 | 6/2012 | Sum | |
| 2012/0172108 | A1 | 7/2012 | Acres | |
| 2012/0172130 | A1 | 7/2012 | Acres | |
| 2012/0270638 | A1 | 10/2012 | Eubanks | |
| 2013/0005446 | A1 | 1/2013 | Englman | |
| 2013/0065663 | A1 | 3/2013 | Johnson | |
| 2013/0065665 | A1 | 3/2013 | Watkins | |
| 2013/0157756 | A1 | 6/2013 | Hall | |
| 2014/0087829 | A1 | 3/2014 | Watkins | |
| 2014/0094303 | A1 | 4/2014 | Wabschall | |
| 2014/0179396 | A1 | 6/2014 | Aoki | |
| 2014/0221071 | A1 | 8/2014 | Calio | |
| 2014/0302909 | A1 | 10/2014 | Meyer | |
| 2014/0323192 | A1 * | 10/2014 | Keilwert | G07F 17/3206 463/16 |
| 2014/0342802 | A1 | 11/2014 | Itagaki | |
| 2014/0349732 | A1 | 11/2014 | Pawloski | |
| 2015/0018070 | A1 | 1/2015 | Meyer | |
| 2015/0045106 | A1 | 2/2015 | You | |
| 2015/0087382 | A1 | 3/2015 | Gilbertson | |
| 2015/0221176 | A1 | 8/2015 | Meyer | |
| 2015/0228163 | A1 | 8/2015 | Clarebrough | |
| 2015/0302482 | A1 | 10/2015 | Vagner | |
| 2015/0356813 | A1 | 12/2015 | Mead | |
| 2015/0379809 | A1 | 12/2015 | Clarebrough | |
| 2016/0049050 | A1 | 2/2016 | Berman | |
| 2016/0358412 | A1 | 12/2016 | Eaton | |
| 2017/0024970 | A1 | 1/2017 | Sherrets | |
| 2017/0032609 | A1 | 2/2017 | Inamura | |
| 2017/0032611 | A1 | 2/2017 | Luong | |
| 2017/0046908 | A1 | 2/2017 | Murphy | |
| 2017/0092071 | A1 | 3/2017 | Cuddy | |
| 2017/0124805 | A1 | 5/2017 | Prabhu | |
| 2017/0178460 | A1 | 6/2017 | Berman | |
| 2017/0301175 | A1 | 10/2017 | Acres | |
| 2017/0301177 | A1 | 10/2017 | Pawloski | |
| 2019/0318579 | A1 | 10/2019 | Marsh | |
| 2020/0265681 | A1 | 8/2020 | Eubanks | |
| 2020/0265682 | A1 | 8/2020 | Eubanks | |
| 2021/0312762 | A1 | 10/2021 | Eubanks | |
| 2022/0406142 | A1 | 12/2022 | Eubanks | |
| 2023/0306821 | A1 | 9/2023 | Eubanks | |

FOREIGN PATENT DOCUMENTS

| | | | | |
|---|---|---|---|---|
| AU | 2011285816 | B2 | 4/2015 | |
| AU | 2016234913 | A1 | 4/2017 | |
| EP | 2219161 | A1 * | 8/2010 | G07F 17/3211 |

(56) References Cited

FOREIGN PATENT DOCUMENTS

| | | | | | |
|---|---|---|---|---|---|
| GB | 2336233 | A | * | 10/1999 | .......... G07F 17/3211 |
| JP | 2016202587 | A | | 12/2016 | |
| KR | 20100136672 | A | * | 12/2010 | .......... G07F 17/3211 |

OTHER PUBLICATIONS

Office Action (Notice of Allowance and Fees Due (PTOL-85)) dated Jun. 12, 2024 for U.S. Appl. No. 18/468,348 (pp. 1-10).
Office Action (Notice of Allowance and Fees Due (PTOL-85)) dated Jun. 24, 2024 for U.S. Appl. No. 18/348,577 (pp. 1-8).
Office Action (Non-Final Rejection) dated Dec. 21, 2023 for U.S. Appl. No. 18/328,068 (pp. 1-18).
Notice of Allowance dated Sep. 25, 2020 for U.S. Appl. No. 16/100,851 (pp. 1-5).
Office Action dated Oct. 28, 2020 for U.S. Appl. No. 16/841,290 (pp. 1-17).
Office Action dated Jan. 25, 2021 for U.S. Appl. No. 16/841,337 (pp. 1-11).
Office Action dated Feb. 5, 2021 for U.S. Appl. No. 16/122,592 (pp. 1-9).
Office Action dated Feb. 4, 2021 for U.S. Appl. No. 16/841,290 (pp. 1-8).
Australian Examination Report No. 1 for App. No. AU2016234913, dated Feb. 9, 2021, 4 pages.
Notice of Allowance dated Feb. 24, 2021 for U.S. Appl. No. 16/841,290 (pp. 1-9).
Notice of Allowance dated Feb. 24, 2021 for U.S. Appl. No. 16/841,337 (pp. 1-9).
Notice of Allowance dated Apr. 28, 2021 for U.S. Appl. No. 16/122,592 (pp. 1-9).
Office Action (Non-Final Rejection) dated Sep. 10, 2021 for U.S. Appl. No. 17/069,564 (pp. 1-11).
Office Action (Non-Final Rejection) dated Feb. 8, 2022 for U.S. Appl. No. 17/091,740 (pp. 1-14).
Office Action (Notice of Allowance and Fees Due (PTOL-85)) dated Mar. 24, 2022 for U.S. Appl. No. 17/069,564 (pp. 1-9).
Office Action (Non-Final Rejection) dated Mar. 24, 2022 for U.S. Appl. No. 17/104,390 (pp. 1-6).
Office Action (Non-Final Rejection) dated Apr. 14, 2022 for U.S. Appl. No. 17/347,279 (pp. 1-8).
Office Action (Notice of Allowance and Fees Due (PTOL-85)) dated May 10, 2022 for U.S. Appl. No. 17/347,279 (pp. 1-8).
Office Action (Notice of Allowance and Fees Due (PTOL-85)) dated Jun. 17, 2022 for U.S. Appl. No. 17/104,390 (pp. 1-8).
Office Action (Notice of Allowance and Fees Due (PTOL-85)) dated Jul. 7, 2022 for U.S. Appl. No. 17/091,740 (pp. 1-5).
Australian Examination Report No. 1 issued in App. No. AU2022200674, dated Dec. 20, 2022, 4 pages.
Office Action (Non-Final Rejection) dated Feb. 16, 2023 for U.S. Appl. No. 17/872,947 (pp. 1-6).
Office Action (Notice of Allowance and Fees Due (PTOL-85)) dated Apr. 5, 2023 for U.S. Appl. No. 17/872,947 (pp. 1-8).
Office Action (Non-Final Rejection) dated Apr. 27, 2023 for U.S. Appl. No. 17/892,674 (pp. 1-9).
Office Action (Notice of Allowance and Fees Due (PTOL-85)) dated Jun. 14, 2023 for U.S. Appl. No. 17/892,674 (pp. 1-8).
Office Action (Notice of Allowance and Fees Due (PTOL-85)) dated Jun. 26, 2023 for U.S. Appl. No. 17/409,440 (pp. 1-8).
Notice of Allowance dated Jun. 4, 2020 for U.S. Appl. No. 16/100,851 (pp. 1-7).
Notice of Allowance dated Sep. 3, 2020 for U.S. Appl. No. 15/951,802 (pp. 1-8).
Office Action (Non-Final Rejection) dated Sep. 28, 2023 for U.S. Appl. No. 18/048,337 (pp. 1-7).
Office Action (Notice of Allowance and Fees Due (PTOL-85)) dated Dec. 21, 2023 for U.S. Appl. No. 18/048,337 (pp. 1-5).
Australian Examination Report No. 1 issued in App. No. AU2019202557, dated Jan. 24, 2024, 3 pages.
Office Action dated Mar. 21, 2024 for U.S. Appl. No. 18/348,577 (pp. 1-7).
Notice of Allowance dated Apr. 5, 2024 for U.S. Appl. No. 18/328,068 (pp. 1-8).
Australian Examination Report No. 1 issued in App. No. AU2019213428, dated May 1, 2024, 3 pages.
Australian Examination Report No. 1 issued in App. No. AU2023278048, dated Sep. 11, 2024, 4 pages.
Office Action (Non-Final Rejection) dated Oct. 28, 2024 for U.S. Appl. No. 18/048,334 (pp. 1-10).

* cited by examiner

GAMING MACHINE AND METHOD FOR REPLAYING REELS

CROSS-REFERENCE TO RELATED APPLICATIONS

This application is a continuation of and claims priority to U.S. patent application Ser. No. 18/048,337, filed Oct. 20, 2022, which is a continuation of U.S. patent application Ser. No. 17/104,390, now U.S. Pat. No. 11,482,078, filed Nov. 25, 2020, which is a continuation of U.S. patent application Ser. No. 16/100,851, now U.S. Pat. No. 10,867,479, filed Aug. 10, 2018, all of which are incorporated by reference herein in their entireties.

TECHNICAL FIELD

The field of disclosure relates generally to electronic gaming, and more particularly to an electronic gaming machine and method that awards a plurality of replays that automatically re-spins the reels for additional rewards, the additional rewards may provide an increased game award.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines are also configured to present a base or primary game as well as a bonus or secondary game, which may be triggered from the primary game, such as, for example, based upon the occurrence of a winning pattern of symbols occurring in the primary game. Many types of bonus games have been devised. However, new and exciting bonus games are desirable and player demand for such games continues undiminished.

BRIEF DESCRIPTION

In one embodiment, an electronic gaming machine is provided. An electronic gaming machine includes a display, a credit input mechanism including at least one of a card reader, a ticket reader, a bill acceptor, and a coin input mechanism, the credit input mechanism configured to receive a credit wager, a storage medium having instructions stored thereon, and a processor. The processor is coupled to the display, the credit input mechanism, and the storage medium. When executed, the instructions cause the processor to at least (i) determine, during a wagering game initiated in response to receiving the credit wager, that a replay trigger condition is satisfied, the wagering game including a plurality of reels; (ii) initiate, in response to the replay trigger condition, a replay bonus game; (iii) determine a number of replays for use in the replay bonus game; (iv) generate a set of symbols for the plurality of reels for each of the number of replays including an equal award amount associated with the set of symbols; (v) serially display, on the display, each of the sets of symbols for each of the number of replays; and (vi) award a total award amount including the sum of each award amount for each of the sets of symbols.

In another embodiment, a method of electronic gaming implemented on an electronic gaming machine is provided. The electronic gaming machine includes at least one processor in communication with at least one memory device and with a display. The method includes: (i) determining, during a wagering game initiated in response to receiving a credit wager, that a replay trigger condition is satisfied, the wagering game including a plurality of reels; (ii) initiating, in response to the replay trigger condition, a replay bonus game; (iii) determining a number of replays for use in the replay bonus game; (iv) generating a set of symbols for the plurality of reels for each of the number of replays including an equal award amount associated with the set of symbols; (v) serially displaying, on the display each of the sets of symbols for each of the number of replays; and (vi) awarding a total award amount including the sum of each award amount for each of the sets of symbols.

In yet another embodiment, a computer-readable storage medium having computer-executable instructions embodied thereon is provided. When executed by an electronic gaming machine having at least one processor coupled to at least one memory device, the computer-executable instructions cause the at least one processor to: (i) determine, during a wagering game initiated in response to receiving a credit wager, that a replay trigger condition is satisfied, the wagering game including a plurality of reels; (ii) initiate, in response to the replay trigger condition, a replay bonus game; (iii) determine a number of replays for use in the replay bonus game; (iv) generate a set of symbols for the plurality of reels for each of the number of replays including an equal award amount associated with the set of symbols; (v) serially display each of the sets of symbols for each of the number of replays; and (vi) award a total award amount including the sum of each award amount for each of the sets of symbols.

BRIEF DESCRIPTION OF THE DRAWINGS

An example embodiment of the subject matter disclosed will now be described with reference to the accompanying drawings.

DETAILED DESCRIPTION

An electronic gaming machine is described herein, in which a replay bonus game may be triggered from a primary reel game. Specifically, a number of winning bingo patterns may be determined in the primary game, and the replay bonus game may be triggered if the number of winning patterns exceeds a threshold number of winning patterns. The replay bonus game may also be triggered based on the size of award in the primary game. Once the replay bonus game is triggered, a number of replays may be provided to the player, each causing a re-spin of the reels displayed in the primary game. Each replay provides an equal award amount to the player, where the replay awards total up to a predetermined final reward. In some embodiments, each replay provides a duplicate plurality of symbols, such that each replay provides the same award and the same plurality of symbols. In addition, a numerical indicium may be displayed on a secondary display of the electronic gaming machine. The numerical indicium may count-up from an initial number of replays (such as zero) to a final replay number, one replay at a time, and each time the reels are re-spun, to build player excitement and signify progress towards the final award. Furthermore, the display may change appearance to simulate a malfunction. Although the malfunction is only simulated to add excitement to the player's experience, the machine is not really malfunctioning.

As used herein, the terms "primary game" and "base game" may refer to games initiated in response to one of a plurality of game initiation events, such as a wager or credit being received by or transferred to an EGM, as described herein. A primary game may be associated with a primary game outcome represented by a plurality of primary game symbols or primary game reels, each of which may include a plurality of primary game symbols, and each of which may be selected based upon a random number generated by a random number generator.

Further, as used herein, the terms "secondary game" and "bonus game" may refer generally to a game or a component of a game involving procedures in addition to the primary game. In some embodiments, a bonus game may be triggered from a primary game and may be associated with a bonus game outcome, which may be different from the primary game outcome. For example, a bonus game may be initiated after, or during, a primary game and in response to the occurrence of a particular condition, such as a "trigger condition" occurring during the primary game. A bonus game may result in a bonus game outcome or bonus award that increases a primary game award or adds a bonus game award to a primary game award.

Figure 1:
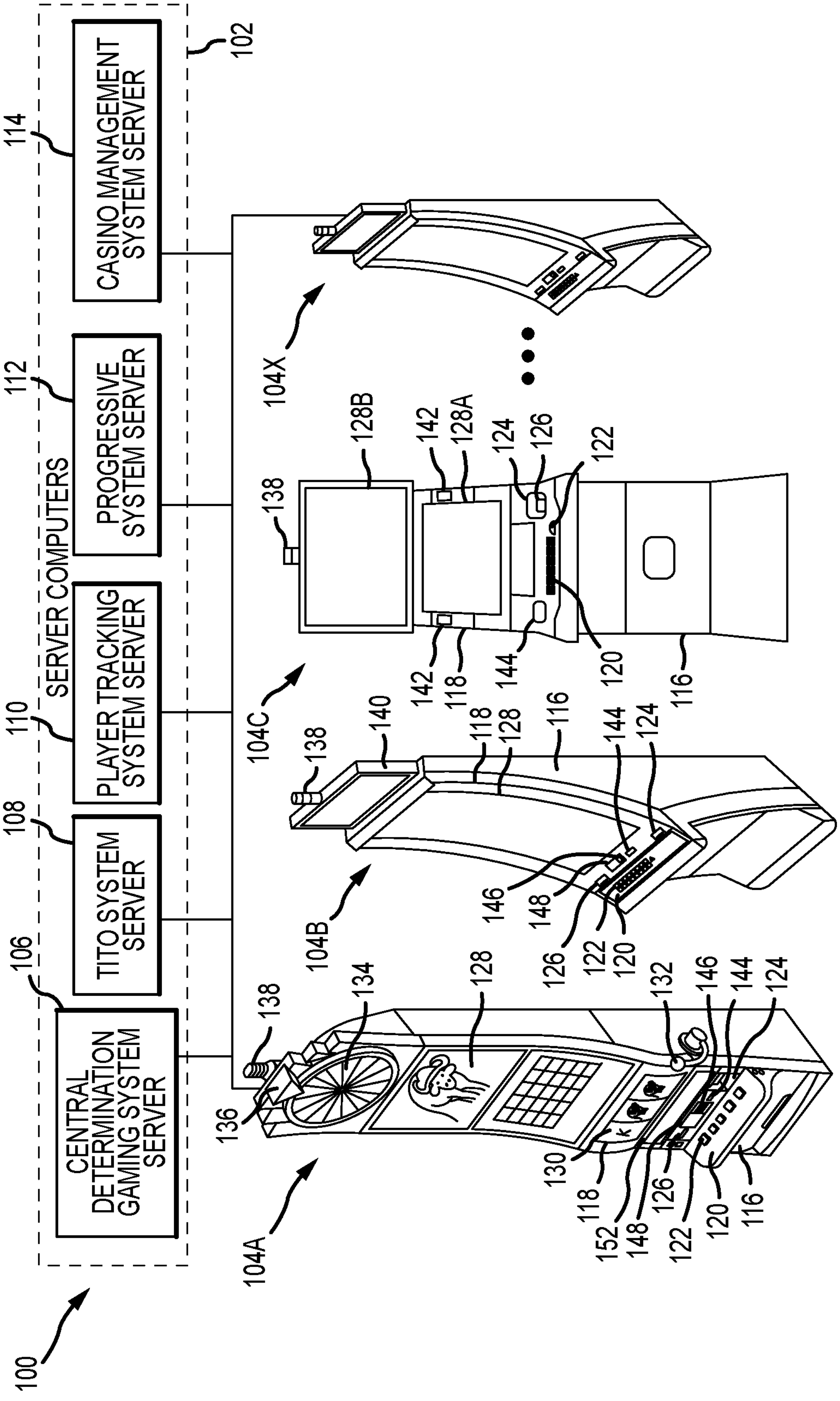
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
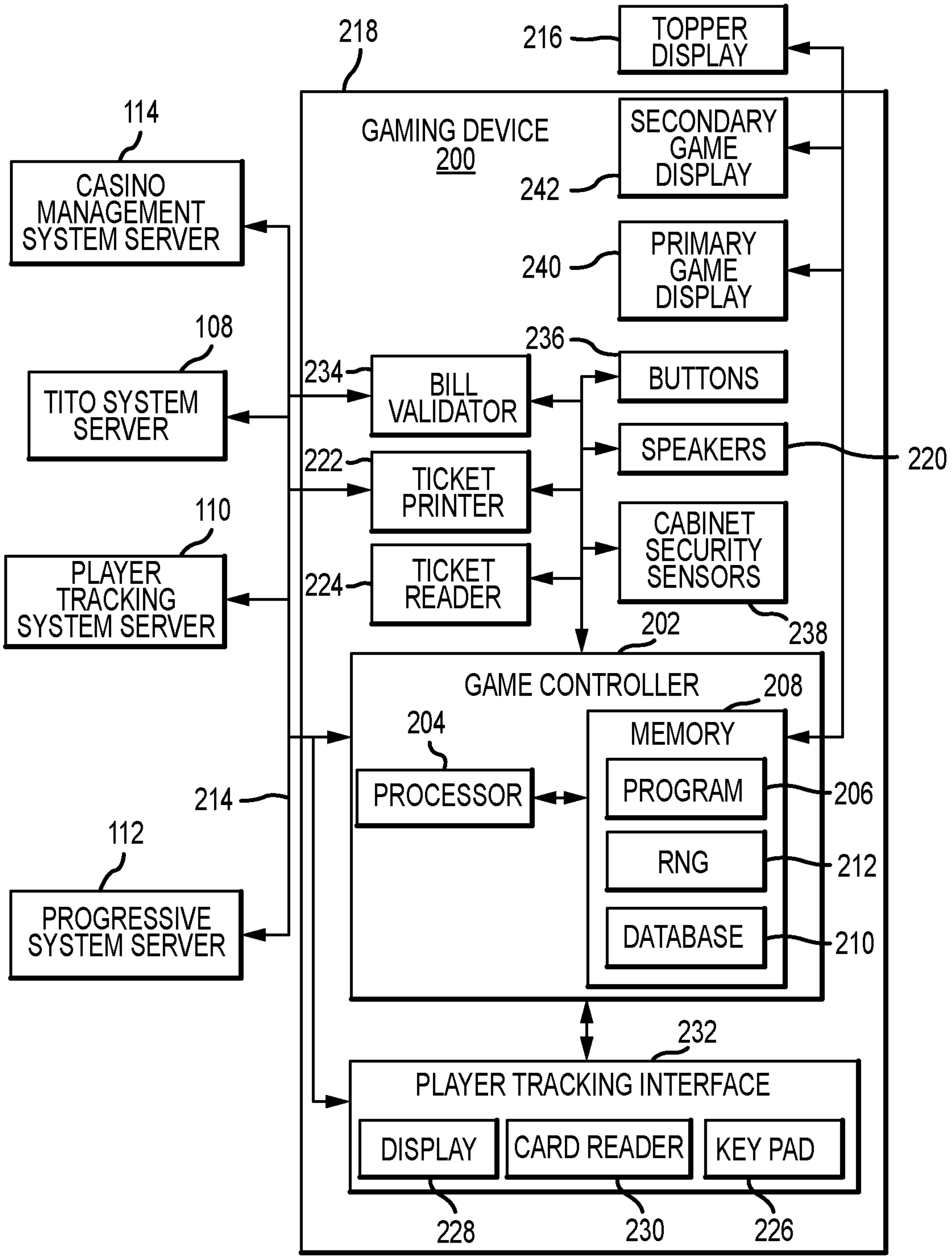
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in memory 208 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232. Player tracking interface 232 may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
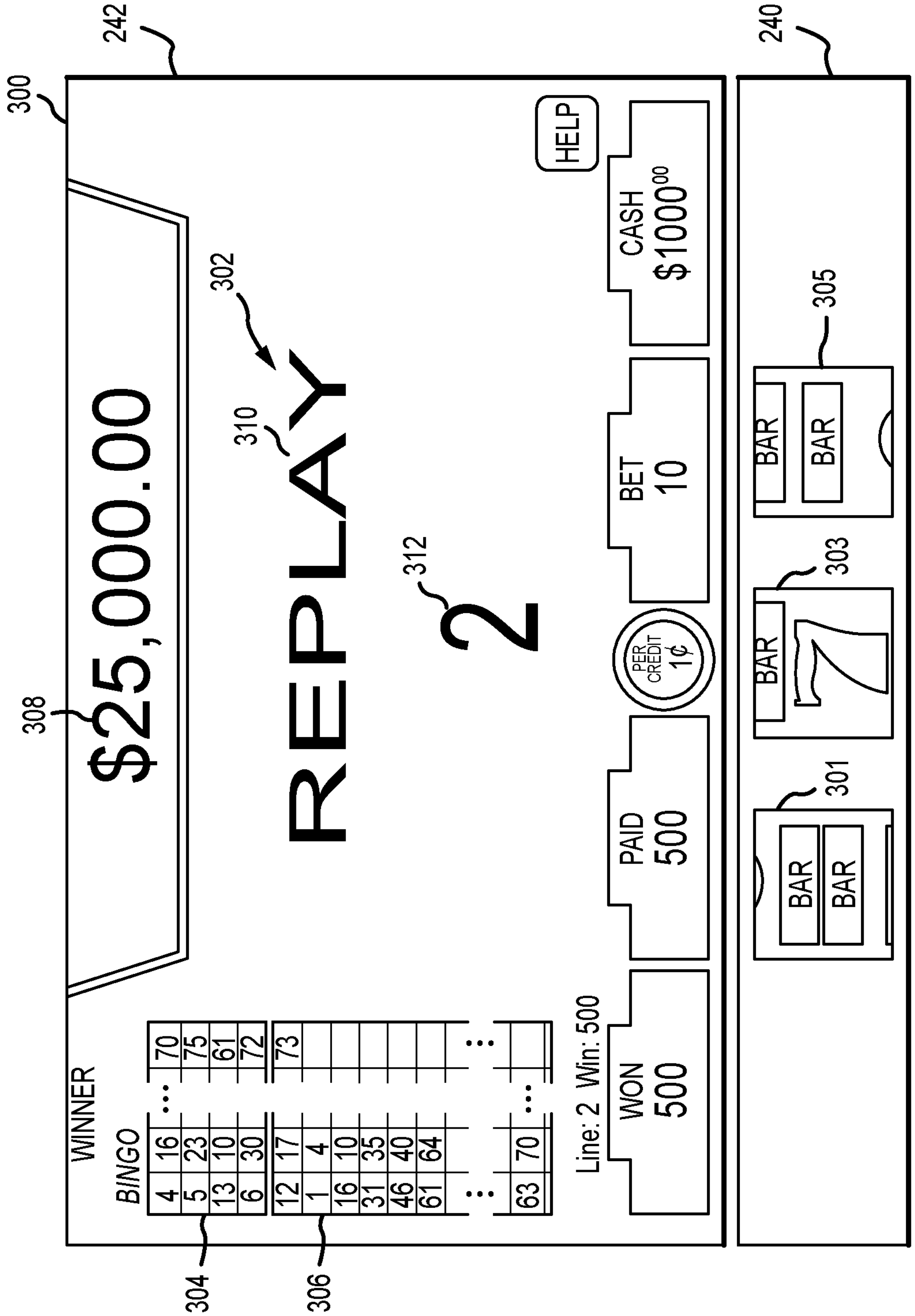
FIG. 3 is a schematic diagram of an exemplary replay game played on an EGM shown at FIG. 1, in which an initial numerical indicium is displayed.

FIG. 3 is a schematic diagram of an exemplary replay bonus game 300 played on an EGM 104A-104X (shown at FIGS. 1 and 2). In various embodiments, replay bonus game 300 may be played as a primary or base game and/or as a bonus game that is triggered from the primary game. In other words, the functionality described herein with respect to replay bonus game 300 may be implemented in any suitable wagering game, including in any primary game as well as in any bonus game.

Accordingly, a wagering game may be initiated on an EGM 104A-104X. Specifically, a player may fund the wagering game via bill validator 234 and/or ticket reader 224. Once funded, a primary game, which may include a plurality of reels 301, 303, and/or 305, each including a plurality of symbols, may appear on a display, such as on primary game display 240. These reels 301-305 may be physical reels and/or virtual reels and may range from one reel to five or more reels in number. As used herein, physical reels are mechanical in nature and may be physically rotated during gameplay. In contrast, virtual reels are rendered or visually created by game controller 202 on a display, such as primary game display 240, and are merely animated to give the appearance of being spun.

In various embodiments, the wagering game may include any suitable game of chance. For example, in at least some embodiments, the wagering game is a Class II bingo game. In some embodiments a Class II bingo game includes a bingo game display portion 242 and spinning reel game display portion 240. The bingo game display portion 242 includes, or displays, a bingo card 304, and a bingo number listing 306. The bingo number listing 306, more commonly referred to as a "ball call," is randomly generated and increases to a maximum of seventy-five numbers (or balls called) until a game-ending pattern is awarded to a player participating in the bingo game. One common game-ending pattern is a blackout pattern. Other game-ending patterns are also possible. When the game-ending pattern is awarded, the bingo number listing 306 is reset, and the process repeats. During play of the bingo game (e.g., prior to the occurrence of a game-ending pattern), a player is provided a bingo card 304 each time a wager is placed. For example, a player is provided a new bingo card 304 each time a "Spin" or "Play" button is pressed by the player. The bingo card 304 is compared to the current bingo number listing 306, and numbers on the bingo card 304 matching numbers in the bingo number listing 306 are marked or "daubed" on the bingo card 304. Finally, the marked or daubed bingo card 304 is evaluated against a paytable of winning bingo patterns. Specifically, if the bingo card 304 includes a pattern that matches a pattern in the paytable of winning patterns, an award is provided to the player in the bingo game. In some embodiments the player may be awarded for multiple patterns (e.g. all patterns) that are matched when the bingo card is evaluated against the paytable of winning patterns. In other embodiments the player may be awarded for only the highest priority pattern (e.g. the highest paying pattern) that is matched. In some embodiments, during play of a Class II game, a player is provided a single bingo card 304 for multiple plays of the bingo game, with a new bingo number listing 306 generated for each play of the bingo game. Other methods of play of a Class II bingo game are also possible and are within the scope of this invention.

In conjunction with the underlying main bingo game, a spinning reel game façade is shown. Specifically, a plurality of reels 301, 303 and 305 are displayed within the reel game display portion 240. Each time the main bingo card 304 is daubed and evaluated, the outcome of the evaluation is mapped to an outcome in the reel game façade. For example, a winning bingo game outcome may be mapped to a winning combination of reels 301, 303 and 305. Similarly, a non-winning bingo game outcome may be mapped to a non-winning combination of reels 301, 303 and 305. Thus, the results of the bingo game are mapped to a reel game façade that simply reflects an outcome of the bingo game as a particular combination of reels 301, 303 and 305.

However, in other embodiments, the wagering game may be a Class III "Las Vegas Style" wagering game. Specific details of the type of wagering game used are not central to an understanding of the present disclosure.

During play of the primary game, game controller 202 may determine that a replay trigger condition is satisfied, and, in response, initiate replay bonus game 300. In various embodiments, a replay trigger condition may include any suitable trigger condition, such as, for example, generation by RNG 212 of a random number within a range of random numbers and/or a specific or preselected symbol combination occurring on the reels in the primary game. For example, in a Class III embodiment, the replay trigger condition may be satisfied when a preselected or predefined symbol combination occurs on reels 301-305 in the primary game, such as, for example, a symbol combination associated with a game award that is greater than or equal to a predetermined award value and/or when the predetermined award value is capable of being broken up or segmented into a number of replays.

In some embodiments, and as described in additional detail below, the replay trigger condition may be satisfied when a number of winning patterns in a bingo-based primary game (e.g., a Class II embodiment) exceeds a threshold number of winning patterns. In other embodiments, the replay trigger condition may be satisfied when an award associated with a bingo winning pattern is greater than or equal to a predetermined award value and/or when the predetermined award value is capable of being broken up or segmented into a threshold number of replays. In other embodiments, the replay trigger condition may be conditioned based on the random number generated by RNG 212 (e.g., a "triggering range" within the domain of the RNG 212). It will, however, be appreciated that these replay trigger conditions are merely exemplary and that other replay trigger conditions may be implemented as well. Further, combinations of any of the triggering conditions described herein may be used to form a composite triggering condition (e.g., exceeding a threshold number of winning patterns and having an RNG falling within a triggering range).

In some embodiments, an award is divided up into a plurality of portions. In these embodiments, the award is divided into a plurality of increasing awards. The increasing awards are displayed on a series of screens where the increasing award amount is displayed. For example, a first screen displays an award of 10 credits, the second screen displays an award of 25, a third screen displays an award of 50 credits, etc. In these embodiments, the replay bonus game feature is triggered during the increasing award amount screens. More specifically, the game controller 202 initiates replays part-way through the series of screens for the increasing award amount screens. Following the above example, game controller 202 awards a first screen with 25 credits and a second screen with 50 credits. Then game controller 202 triggers the replays and repeats the second screen and the award of 50 credits three times. Then the game controller 202 resumes the increasing awards and awards a third screen with 100 credits. This gives a total of 375 credits. Triggering the replays during the increasing award amount screens, heightens the player excitement as the player does not know how many times the award will be repeated. In some further embodiments, the increasing award screens may be colored a first color, i.e., red and the replay award screens may be colored a different color, i.e., blue. Based on the above example, the screen would start off red for the first two screens, then switch to blue for the three replays, and then return to red for the last award screen. In a further embodiment, the award may be divided into multiple sets of replays, where each set of replays provides a different award amount. In this embodiment, the game controller 202 may award three replays at 10 credits each and then two replays at 25 credits each, which are then followed by four replays at 50 credits each.

When replay bonus game 300 is initiated, game controller 202 may award one or more replays of the reels displayed in the primary game. The number of replays awarded may be based upon any suitable criterion or group of criteria, such as, for example, the value of the random number generated by RNG 212, the symbol combination occurring on reels 301-305 during the primary game, the size of the final award, and the like.

For example, in one embodiment (e.g., where the wagering game is a Class II bingo-based wagering game), the number of replays awarded may correspond to a number of winning bingo patterns occurring in the primary game. For example, a bingo card provided in the primary game may be evaluated against a ball call to determine that the bingo card includes a number of winning patterns. Each winning pattern may be awarded as, or result in, a replay in replay bonus game 300. As an example, a bingo card provided in the primary game may be evaluated against a ball call to determine that there are eight winning patterns occurring on the bingo card, and each of these eight winning patterns may result in an individual replay in replay bonus game 300, such that, in this case, eight replays are awarded. In addition, as described herein, replay bonus game 300 may not be triggered unless the number of winning patterns awarded in the primary game exceeds a threshold number of winning patterns, such as, for example four winning patterns, eight winning patterns, etc. Furthermore, each of the winning patterns may be determined to be an individual replay, where the game controller generates a replay based on the individual pattern. Moreover, the total award of the winning patterns may be combined and then divided by the number of winning patterns, to provide a number of replays equal to the number of winning patterns that each award an equal portion of the total award. In some embodiments, the number of replays is based on the number of winning patterns.

In another Class II embodiment, the number of replays awarded may correspond to a number of segments or portions of a subdivided bingo game award. For example, when the replay trigger condition is satisfied by a bingo game award of sufficient value (as described above), the bingo game award may be subdivided into a plurality of smaller awards, each of which may be associated with a replay. As an example, a bingo game award of 1,000 credits may be subdivided into four smaller awards of 250 credits each. Each of the four smaller awards may be associated with an individual replay, and each of these individual replays, as described herein, provides or awards one of the four smaller awards.

In a Class III embodiment, the number of replays awarded may correspond to a number of segments or portions of a subdivided game award in the Class III base game. For example, when the replay trigger condition is satisfied by a primary game award of sufficient value (as described above), the game award may be subdivided into a plurality of smaller awards, each of which may be associated with a replay, and provided in conjunction with one of the smaller sub-awards.

In another Class II or Class III embodiment, each replay may correspond to a particular game outcome, such as any winning and/or non-winning game outcome. For example, winning and/or non-winning game outcomes may, in some embodiments, result in replays. However, and in at least some embodiments, only winning game outcomes may result in replays. Moreover, as described above, in some embodiments, game controller 202 may simply (randomly) award a number of replays.

Thus, replay bonus game 300 may be implemented in Class II and Class III embodiments, and a replay trigger condition and/or a number of replays awarded during replay bonus game 300 may be variously determined. In addition, the methods for determining the replay trigger condition and/or a number of replays described above are merely illustrative, and it will be appreciated that other approaches are contemplated and within the scope of the present disclosure.

With continuing reference to FIG. 3, a count-up animation 302 of the number of replays awarded during replay bonus game 300 may be displayed, such as, for example, on secondary game display 242. The count-up animation 302 may be displayed to build player excitement, such as, for example, where the player knows that a number of replays have been awarded based upon the appearance of count-up animation 302 and/or the appearance of replay bonus game 300 on secondary game display 242, but where the player does not know specifically how many replays have been awarded.

In addition to count-up animation 302, a bingo card 304 may be displayed. As described above, the number of replays awarded may correspond to a number of winning patterns occurring on bingo card 304. As those of skill will appreciate, the number of winning patterns may be determined based upon a ball call 306, which may be displayed as well. Moreover, a table or database of winning patterns may be stored in a computer memory of any of EGMs 104A-104X, such as memory 208, which may be a tangible, non-transitory, computer-readable memory.

Accordingly, to determine a number of winning patterns, bingo card 304 may be "daubed" by game controller 202 based upon the list of numbers included in ball call 306. The daubed bingo card 304 may also be displayed, such as, for example, by highlighting each daubed number. Once bingo card 304 is daubed, game controller 202 may compare the numbers daubed on bingo card 304 to every winning pattern in the database of winning patterns. Further, as described above, game controller 202 may identify and translate the number of winning patterns occurring on bingo card 304 to a number of replays in replay bonus game 300. For example, if seven winning patterns are identified on bingo card 304, game controller 202 may award seven replays. Likewise, game controller 202 may not trigger replay bonus game 300 until the number of winning patterns exceeds a threshold number of winning patterns. To this end, game controller 202 may, in some embodiments, count, or determine a number of, winning patterns and/or replays awarded. In some embodiments, the number of replays is based on the number of winning patterns.

In the exemplary embodiment, a game award 308, capable of being won, may also be displayed in conjunction with replay bonus game 300. Game award 308 may be any suitable type of game award, such as, for example, and as shown, a jackpot award and/or a progressive jackpot award. In other embodiments, game award 308 may be one or more of a replay or a plurality of replay, and/or an additional or different bonus game different from replay bonus game 300. In some cases, game award 308 may correspond to a change or alteration of a symbol or symbols displayed on reels 301-305 (e.g., from the primary game and displayed on primary game display 240). In another embodiment, game award 308 may cause a multiplier or multiplication factor to be added to a monetary award in the primary game and/or to the jackpot in replay bonus game 300. Further, in at least some embodiments, game award 308 may cause one or more wild symbols to be added to reels 301-305 in the primary game.

Thus, game award 308 may generally include any suitable award and/or game feature capable of presentation as an award or bonus. As a result, although a variety of award options are described above, it will be appreciated that any suitable game award and/or game feature may be presented and/or offered in conjunction with replay bonus game 300.

In some embodiments, the number of replays may trigger the player winning one or more additional awards, e.g. one or more bonus awards which may be progressive bonus awards. For example, four replays may correspond to a "MINI" progressive game award, and eight replays may correspond to a "MINOR" progressive game award. Larger number of replays may correspond to superior or larger, game awards, such as a “MAJOR,” or “GRAND” progressive game awards. Game controller 202 may determine the corresponding game award based on the number of replays awarded. In other embodiments, the number of replays may trigger a multiplier, which then may be applied to each replay award amount. For example, eight replays may trigger a 2× award multiplier, and twelve replays may trigger a 3× award multiplier.

In various embodiments, count-up animation 302 may include several components. For example, count-up animation 302 may include a central animation 310 and/or a numerical indicium 312, which may appear, depending upon a presentation desired, in one or more locations within replay bonus game 300. Central animation 310 may include a game theme. Accordingly, the theme associated with central animation 310 may be any suitable theme and is not restricted to any particular theme. In some embodiments, the replay trigger condition and/or game award 308 described above may be associated with or tied to a game theme.

Notably, in at least some embodiments, a number of winning game outcomes/replays may exceed a number of replays required to trigger game award 308. For example, a player may receive, in some cases, in excess of 100 replays; however, game award 308 may trigger at four (or any other suitable number of) replays.

Accordingly, in some embodiments, replay bonus game 300 may not be triggered unless a number of winning outcomes (and thus replays) exceeds a threshold number of winning outcomes and/or replays. In other embodiments, replay bonus game 300 may be triggered if fewer than the threshold number of winning outcomes and/or replays are awarded or if a different (lower) threshold number of winning outcomes and/or replays are awarded. However, where that is the case, game award 308 may not be provided or triggered unless the number of winning outcomes and/or replays exceeds the threshold number of winning outcomes and/or replays. Moreover, the number of replays awarded may exceed the number of replays needed to trigger game award 308. In other embodiments, the number of replays to trigger the replay bonus game 300 may be one, where the replay bonus game 300 provides a single replay.

Numerical indicium 312 may be displayed and increment, from an initial indicium number, through a plurality of intermediate indicia numbers, and to a final indicium number, to visually depict the count-up of replays awarded in replays bonus game 300. Specifically, numerical indicium 312 is animated as part of count-up animation 302 to visually depict a number of replays already shown. As described above, a player may not know how many replays have been awarded in replay bonus game 300 but may watch as numerical indicium 312 is incremented from an initial indicium number to a final indicium number.

In the exemplary embodiment, each replay may be provided and displayed on primary game display 240. Specifically, each time numerical indicium 312 increases or is incremented; the reels displayed on primary game display 240 may be spun or re-spun. In this manner, each replay may be concurrently or simultaneously displayed with each increment of numerical indicium 312, making it clear that each of the replays awarded to the player is causing or generating a re-spin of the reels.

In addition, and as described above, each replay may, in the exemplary embodiment, correspond to a winning game outcome (such as a winning bingo pattern). Game controller 202 may, as a result, determine an award associated with each replay based upon the winning game outcome. For example, if a winning bingo pattern associated with a first replay corresponds to an award of 100 credits (e.g., based upon a bingo paytable), game controller 202 may re-spin the reels during the first replay, and provide an award in association with the first replay of 100 credits. Thus, each replay of the reels may be a winning spin, and an award provided during each replay may correspond to an award associated with the winning bingo pattern (or more broadly, a winning game outcome) mapped or corresponding to the replay. In some embodiments, each replay displays a repeat of the previous plurality of symbols. For example, an award of 500 credits may be awarded based on the wining game outcome. The replay bonus game 300 may display a set of symbols that represents an award of 100 credits. The replay bonus game 300 may then re-spin the reels and display the same set of symbols four more times, each time awarding 100 credits, thus awarding 500 credits in total.

Figure 4:
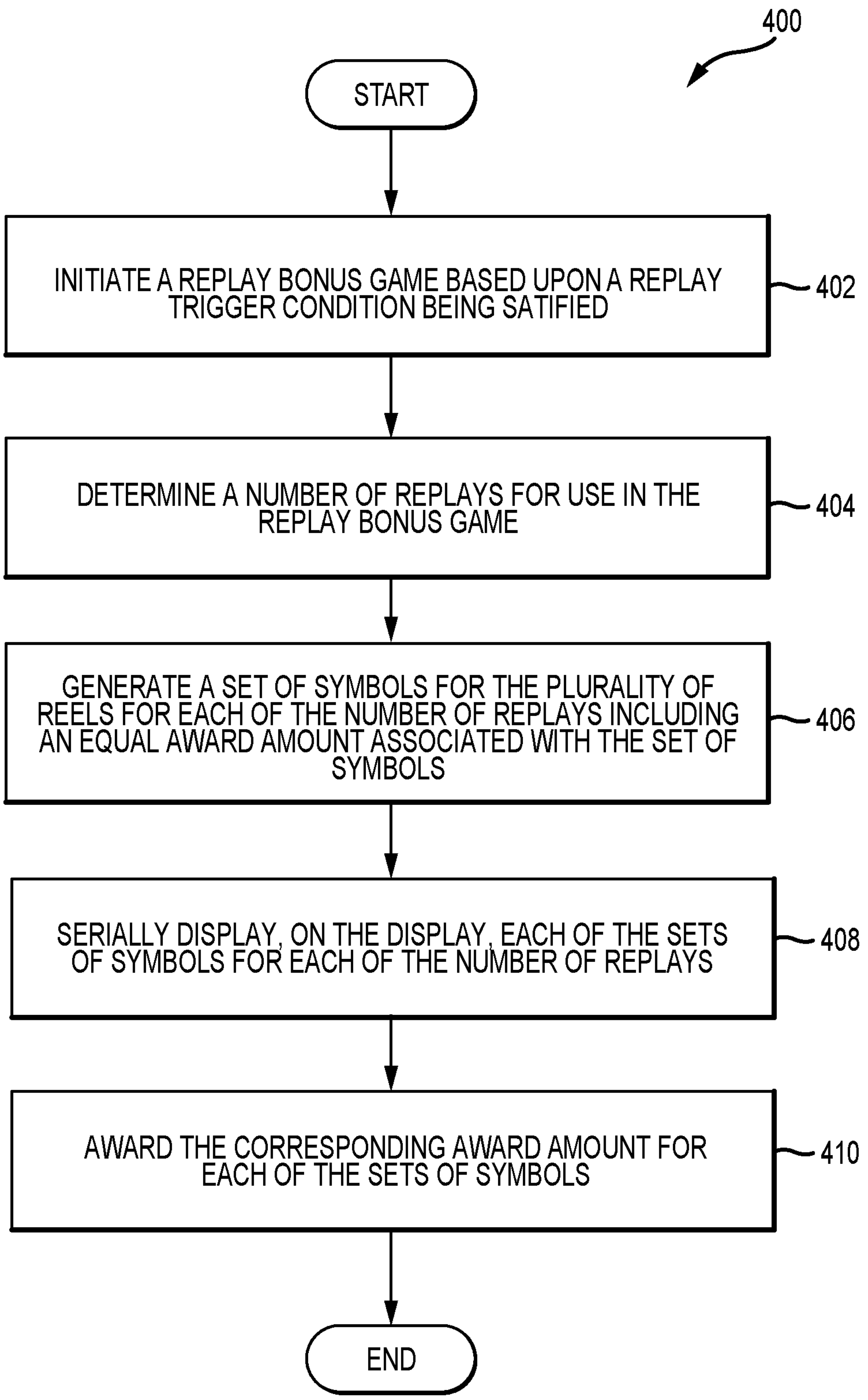
FIG. 4 is a flowchart illustrating a process of playing an electronic wagering game in which one or more replays are awarded based on game play.

FIG. 4 is a flowchart illustrating a process 400 of playing an electronic wagering game in which one or more replays are awarded based on game play, as described above. In the exemplary embodiment, process 400 is performed, at least in part, by game controller 202 (shown in FIG. 2).

In the exemplary embodiment, game controller 202 initiates a wagering game on a plurality of reels in response to receiving a credit wager. Game controller 202 determines that a replay trigger condition is satisfied. In some embodiments, the replay trigger condition is a predetermined symbol combination occurring on the plurality of reels. In other embodiments, the replay trigger condition is a winning game outcome (such as a winning bingo pattern).

In some other embodiments, game controller 202 determines a plurality of bingo game outcomes. The game controller 202 identifies a plurality of winning bingo game outcomes from the plurality of bingo game outcomes. Then the game controller 202 determines the number of replays based upon the plurality of winning bingo game outcomes. In these embodiments, each replay corresponds to a respective equal winning outcome in the wagering game. The replay trigger condition corresponds to a determination that at least one such winning outcome has occurred in the wagering game.

Examples of replay trigger conditions include, but are not limited to, multiple different bingo patterns achieved on the same card (e.g., four corners in 32 balls, north star in 25 balls, corporal stripes in 27 balls, etc.), multiple duplicate bingo patterns achieved on the same card based on having multiple entries in the paytable for the same pattern (e.g., four corners in 32 balls (pay table entry #3128), four corners in 32 balls (pay table entry #3237), four corners in 32 balls (pay table entry #3300), etc.), multiple duplicate bingo patterns achieved on the same card but with different ball draws (e.g., four corners in 32 balls, four corners in 31 balls, four corners in 34 balls, etc.), multiple different duplicate bingo patterns or duplicate patterns with different ball draws on multiple cards, a large bingo win on a single card that is to be broken into smaller wins, a specific bingo win on a single card is achieved and spawns multiple bingo cards where specific patterns must be achieved, and a certain bet amount (e.g., Bet Max) where the bet amount uses a different card. In other embodiments, the replay trigger condition is during a series of increasing award screens as described above.

In the exemplary embodiment, game controller 202 initiates 402, in response to the replay trigger condition, a replay bonus game 300. Replay bonus game 300 displays a plurality of winning sets of symbols and awards the amount associated with each displayed set of symbols to the player.

For example, replay bonus game 300 may award 500 credits over five sets of symbols. The replay bonus game 300 displays a set of symbols that represents an award of 100 credits. The replay bonus game 300 may then re-spin the reels and display the same set of symbols four more times, each time awarding 100 credits. In other examples, the replay bonus game 300 may display different sets of symbols, where each set of symbols awards an equal amount of credits. The replay bonus game 300 displays sets of symbols until the predetermined award (e.g., 500 credits) is awarded. In one example, the trigger condition includes five winning patterns. Game controller 202 determines the total award amount by adding up the awards of the five winning patterns and then divides them by five (the number of replays). Game controller 202 then generates five sets of symbols for the five replay awards.

In the exemplary embodiment, game controller 202 determines 404 a number of replays for use in the replay bonus game 300. In the above example, the game controller 202 determined five replays to award 500 credits. In other examples, the game controller 202 may determine 404 any number of replays. The game controller 202 may determine 404 the number of replays based on the amount of credits to be awarded. In some embodiments, the game controller 202 determines 404 the number of replays randomly. In these embodiments, the game controller 202 may have a maximum number of replays allowed. In some embodiments, the game controller 202 may determine 404 the replays based on predetermined patterns, such as based on the bingo patterns that triggered the replay bonus game 300.

In the exemplary embodiment, game controller 202 generates 406 a set of symbols for the plurality of reels for each of the number of replays including an equal award amount associated with the set of symbols. In some embodiments, game controller 202 determines each award amount and generates 406 the set of symbols for that amount based on a pay table. In some embodiments, the pay table is stored in the database 210 of the gaming device 200 and includes the game outcomes and the sets of symbols associated with each game outcome.

For example, game controller 202 determines 404 that there will be four replays and that each replay will award 20 credits. Then game controller 202 consults the pay table to determine one or more sets of symbols that award 20 credits. Game controller 202 then generates 406 a set of symbols for each of the replays based on the determined sets of symbols that award 20 credits. In some embodiments, game controller 202 determines one set of symbols and repeats that set of symbols for each of the replays. In other embodiments, game controller 202 determines different sets of symbols for each of the replays, where the different sets of symbols each award the predetermined amount (e.g. 20 credits).

In some embodiments, the game controller 202 determines an award amount associated with each of the number of replays. The game controller 202 generates 406 each set of symbols for each of the number of replays based on the award amount. For example, the first reward amount may be 20 credits and the game controller 202 generates 406 a set of symbols to award 20 credits based on the pay table. The second reward amount may be 40 credits and the game controller 202 generates 406 a set of symbols to award 40 credits based on the pay table.

In the exemplary embodiments, game controller 202 instructs the display (for example the primary game display 240) to serially display 408 each of the sets of symbols for each of the number of replays. As each set of symbols is displayed 408, game controller 202 awards 410 a total award amount including the sum of each award amount for each of the sets of symbols.

In some embodiments, the game controller 202 displays a numerical indicium 312 associated with a number of replays remaining. For example the numerical indicium 312 may be displayed on the secondary game display 242. Subsequent to displaying the set of symbols associated with a replay, game controller 202 sequentially counts up the numerical indicium 312 based on the number of replays remaining. For example, replay bonus game 300 awards 4 replays. The game controller 202 instructs the primary game display 240 to display the first set of symbols. The game controller 202 instructs the secondary game display to display the numerical indicium 312 as a '3' as three replays remain.

In some embodiments, the replay trigger condition is a win outcome. The win outcome may be based on a specific card pattern, number on the pay table, or specific combination of symbols that trigger the replay bonus game 300. Game controller 202 determines a total award amount associated with the win outcome. Game controller 202 divides the total award amount into a plurality of award amounts based on the number of replays. Each award amount is associated with a replay. In some further embodiments, the plurality of award amounts are equal. In other embodiments, the plurality of award amounts are different. In still further embodiments, the plurality of award amounts are ordered based on increasing amounts, such that the first replays award the lower amounts and the subsequent replays award greater amounts.

In some embodiments, during the replay bonus game 300, the game controller 202 instructs the primary game display 240 and the secondary game display 242 to display the replay bonus game 300 to simulate a malfunction of the gaming device 200. The malfunction is only simulated to add excitement to the player's experience, the machine is not really malfunctioning. The malfunction simulation may include sound effects, dimmed lighting, animation, and erratic lighting during the replay bonus game 300. In this version of the replay bonus game 300, the reels would repeatedly spin to the same set of symbols and award the same amount. In this embodiment, there would not be any count-up animation 302 or a numerical indicium 312. When the replay bonus game 300 is complete, the displays 240 and 242 would resume normal appearance.

In some embodiments, specific bingo patterns are stored in the pay table to specifically trigger the replay trigger condition, where these specific bingo patterns do not have associated sets of reel symbols in the pay table. In these embodiments, the specific bingo patterns trigger game controller 202 to enter replay bonus game 300 and display a plurality of sets of symbols that each award the player with a portion of the total award amount for that specific bingo pattern.

In some further embodiments, the replay trigger is the player winning a multiplier. In these embodiments, the game controller 202 determines that a multiplier is to be awarded. Instead of announcing the multiplier to the player, the game controller 202 triggers the replay bonus game 300. The game controller 202 displays the original winning amount on a screen. Then the game controller 202 awards a number of replays based on the multiplier. For example, if the original amount won was 200 credits and the player also earned a 5× multiplier, the game controller 202 may then award the original 200 credits and four replays that each award another 200 credits.

In some embodiments, the game controller 202 automatically causes the reels to re-spin for each replay. In other embodiments, the game controller 202 waits for a user input, such as button 122, before displaying the results of the next replay.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one display device;

at least one memory with instructions stored thereon; and at least one processor in communication with the at least one display device and the at least one memory, wherein the instructions, when executed by the at least one processor, cause the at least one processor to:

determine a plurality of subsets of output amounts associated with a total output amount for an electronic game, wherein a first subset of the plurality of subsets comprises a plurality of different output amounts, and wherein a second subset of the plurality of subsets comprises a plurality of equal output amounts;

cause display, on the at least one display device, of first reel spins associated with the plurality of different output amounts in order of increasing output amount, wherein the first reel spins are displayed with a first screen color of the at least one display device; and cause display, on the at least one display device, of second reel spins associated with the plurality of equal output amounts, wherein the second reel spins are displayed with a second screen color of the at least one display device.

2. The electronic gaming device of claim 1, wherein the plurality of equal output amounts comprise replays of an output amount of the plurality of different output amounts that match the output amount of the plurality of different output amounts.

3. The electronic gaming device of claim 2, wherein the instructions further cause the at least one processor to cause display of a numerical indicium that increases with each reel spin of the second reel spins.

4. The electronic gaming device of claim 1, wherein a sum of the plurality of different output amounts and the plurality of equal output amounts is the total output amount.

5. The electronic gaming device of claim 1, wherein the instructions further cause the at least one processor to determine the plurality of subsets of output amounts based at least in part upon one or more messages received from a server and associated with the total output amount.

6. The electronic gaming device of claim 5, wherein the electronic game is a bingo game, and wherein the one or more messages are associated with the total output amount by comprising a bingo number listing.

7. The electronic gaming device of claim 1, wherein the instructions further cause the at least one processor to:

cause display of a first reel spin of the first reel spins, the first reel spin associated with a first output amount of the plurality of different output amounts;

after the first reel spin, cause display of a second reel spin of the first reel spins, the second reel spin associated with a second output amount of the plurality of different output amounts, wherein the second output amount is greater than the first output amount; and after the second reel spin, cause display of the second reel spins, wherein each of the second reel spins are associated with the second output amount.

8. The electronic gaming device of claim 7, wherein the instructions further cause the at least one processor to, after the second reel spins, cause display of remaining reel spins of the first reel spins.

9. At least one non-transitory computer-readable storage medium with instructions stored thereon that, in response to execution by at least one processor, cause the at least one processor to:

determine a plurality of subsets of output amounts associated with a total output amount for an electronic game, wherein a first subset of the plurality of subsets comprises a plurality of different output amounts, and wherein a second subset of the plurality of subsets comprises a plurality of equal output amounts;

cause display of first reel spins associated with the plurality of different output amounts in order of increasing output amount, wherein the first reel spins are displayed with a first screen color; and cause display of second reel spins associated with the plurality of equal output amounts, wherein the second reel spins are displayed with a second screen color.

10. The at least one non-transitory computer-readable storage medium of claim 9, wherein the plurality of equal output amounts comprise replays of an output amount of the plurality of different output amounts that match the output amount of the plurality of different output amounts.

11. The at least one non-transitory computer-readable storage medium of claim 10, wherein the instructions further cause the at least one processor to cause display of a numerical indicium that increases with each reel spin of the second reel spins.

12. The at least one non-transitory computer-readable storage medium of claim 9, wherein a sum of the plurality of different output amounts and the plurality of equal output amounts is the total output amount.

13. The at least one non-transitory computer-readable storage medium of claim 9, wherein the instructions further cause the at least one processor to determine the plurality of subsets of output amounts based at least in part upon one or more messages received from a server and associated with the total output amount.

14. The at least one non-transitory computer-readable storage medium of claim 13, wherein the electronic game is a bingo game, and wherein the one or more messages are associated with the total output amount by comprising a bingo number listing.

15. The at least one non-transitory computer-readable storage medium of claim 9, wherein the instructions further cause the at least one processor to:

cause display of a first reel spin of the first reel spins, the first reel spin associated with a first output amount of the plurality of different output amounts;

after the first reel spin, cause display of a second reel spin of the first reel spins, the second reel spin associated with a second output amount of the plurality of different output amounts, wherein the second output amount is greater than the first output amount; and after the second reel spin, cause display of the second reel spins, wherein each of the second reel spins are associated with the second output amount.

16. The at least one non-transitory computer-readable storage medium of claim 15, wherein the instructions further cause the at least one processor to, after the second reel spins, cause display of remaining reel spins of the first reel spins.

17. An electronic gaming system comprising:

at least one memory with instructions stored thereon; and at least one processor in communication with the at least one memory, wherein the instructions, when executed by the at least one processor, cause the at least one processor to:

cause a plurality of subsets of output amounts associated with a total output amount for an electronic game to be determined, wherein a first subset of the plurality of subsets comprises a plurality of different output amounts, and wherein a second subset of the plurality of subsets comprises a plurality of equal output amounts;

cause first reel spins associated with the plurality of different output amounts to be displayed in order of increasing output amount, wherein the first reel spins are displayed with a first screen color; and cause second reel spins associated with the plurality of equal output amounts to be displayed, wherein the second reel spins are displayed with a second screen color.

18. The electronic gaming system of claim 17, wherein the instructions further cause the at least one processor to cause the plurality of subsets to be determined by transmitting one or more messages associated with the total output amount to an electronic gaming device where the plurality of subsets are determined.

19. The electronic gaming system of claim 17, wherein the instructions further cause the at least one processor to at least one of cause the first reel spins to be displayed or cause the second reel spins to be displayed by transmitting one or more messages to an electronic gaming device where the electronic game is displayed.

20. The electronic gaming system of claim 19, wherein the electronic game is a bingo game, and wherein the one or more messages are associated with a ball call for the bingo game.

* * * * *